United States Patent [19]

Bel

[11] Patent Number: 4,732,462

[45] Date of Patent: Mar. 22, 1988

[54] SAFETY VIEWING APPARATUS FOR CRANE CAR

[76] Inventor: Ronald Bel, 85 Roff St., Staten Island, N.Y. 10304

[21] Appl. No.: 42,862

[22] Filed: Apr. 27, 1987

[51] Int. Cl.[4] .......... G02B 7/18; B60R 1/08

[52] U.S. Cl. .......... 350/632; 350/600; 350/639; 350/574; 350/319; 248/479; 248/480; 212/206

[58] Field of Search .......... 350/631, 632, 600, 623, 350/624, 612, 618, 319, 639, 574; 248/479, 480, 476, 486; 212/206, 205, 211

[56] References Cited

U.S. PATENT DOCUMENTS

| | | | |
|---|---|---|---|
| 1,841,176 | 1/1932 | Fromer | 350/631 |
| 2,065,745 | 12/1936 | Reisert | 350/624 |

FOREIGN PATENT DOCUMENTS

| | | | |
|---|---|---|---|
| 67038 | 6/1948 | Denmark | 350/632 |
| 53538 | 3/1983 | Japan | 350/600 |

*Primary Examiner*—Jon W. Henry
*Attorney, Agent, or Firm*—Peter L. Berger

[57] ABSTRACT

A window is provided in the floor of the crane cab and a reflecting mirror is located in front of the operator which is positioned such that the operator can look through the window without leaving his seat. With the orientation of the mirror and window, the operator can view the area below and behind his seat without having to move from his seat. The operator has a clear view of the area in which the load is to be moved and can determine the best and safest time to move the load.

18 Claims, 7 Drawing Figures

FIG. 3
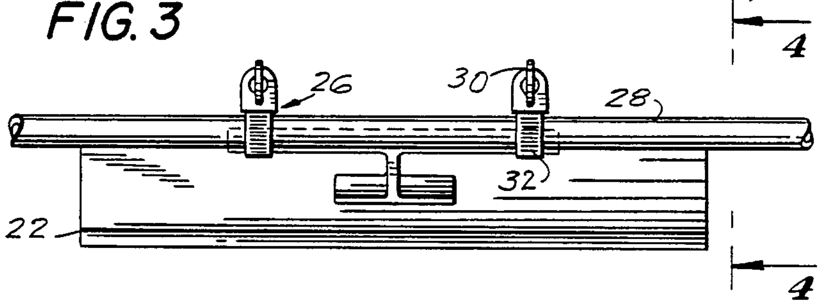
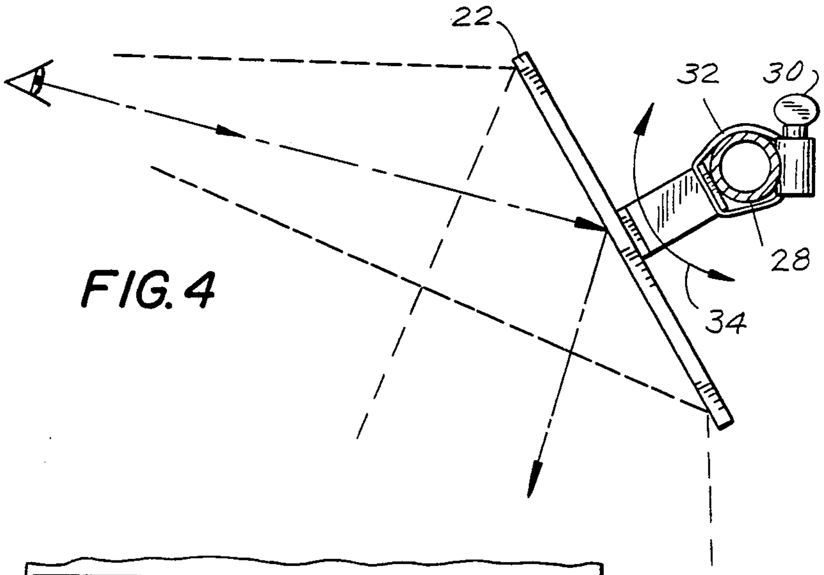
FIG. 4
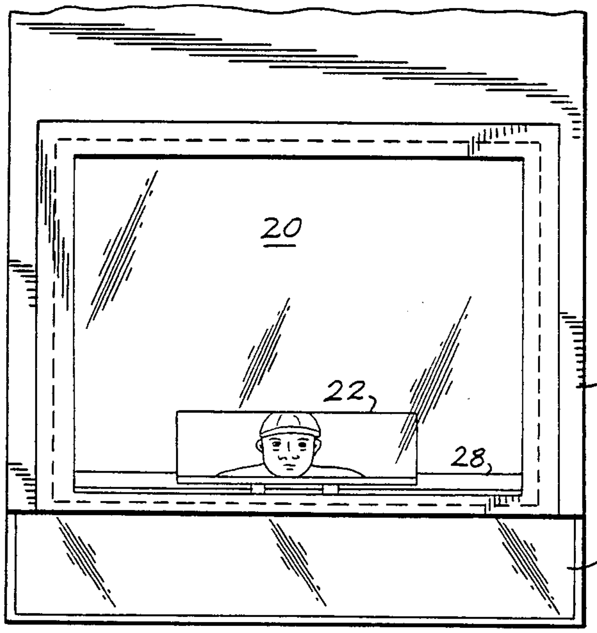
FIG. 5

SAFETY VIEWING APPARATUS FOR CRANE CAR

BACKGROUND OF THE INVENTION

This invention relates to safety apparatus for a crane operator, and more particularly, to such a safety apparatus which permits the operator to have a clear view of the area below and behind the cab.

Cranes are often part of large hauling systems for carrying and moving loads from place to place with the movable range of the crane. These cranes are controlled by operators sitting in cabs located high above ground level. As the crane lifts a load to move it, the operator can see below but not behind him. This can be dangerous because the load may not be lifted high enough to clear someone standing in its path.

This matter is of particular importance on cranes used to move loads on large container carrying ships. Standard operating procedure is to lift the load only three or four feet to clear containers or other obsticles before carrying it to a new location. If a person is near the load in the path of movement, the operator not seeing him will continue to trolley until he sees such person and then stop, which may be too late. Similarly, a load is not supposed to be trolleyed onto a chassis until a chassis is in place to receive the load. Operators seeking to save time will trolley the load to be placed on a chassis because the operator cannot see the chassis located behind and beneath the cab.

Presently, the crane operator leaves his seat or leans forward in an attempt to see below and behind him. This is difficult to do, and often, by the time the operator resumes his operating position the situation has changed. Additionally, there are times when radio communication between the operator and dock personnel is broken. Then too, the operator will automatically trolley the load over the dock not knowing whether or not there is a chassis waiting. This means that the operator will take unnecessary risks to workers on the loading platforms or decks, or the unnecessary running of the equipment.

An object of this invention is to provide a safety apparatus for a crane cab which is easy to use and can easily be used with standard crane cabs.

Another object of this invention is to provide such a safety apparatus which permits the operator to view the area beneath and behind the crane cab without the operator leaving his seat.

Still another object of this invention is to provide such a safety apparatus which is inexpensive, susceptible of widespread use and easy to use and learn.

Yet another object of this invention is to prove such a safety apparatus which eliminates human hazard and lessens unnecessary crane operation.

Other objects, advantages and features of this invention will become more apparatus hereinafter.

SUMMARY OF THE INVENTION

In accordance with the principles of the invention, the above objects are accomplished by providing a window in the floor of the crane cab and a reflecting mirror located in front of the operator so positioned that the operator can look through the window without leaving his seat. With the orientation of the mirror and window, the operator can view the area below and behind his seat without having to leave his position. Additionally, the operator has a clear view of the area in which the load is to be moved and can determine the approximate time to move the load. Still further, the operator has a clear view of the area in which the load will be moved as it is moved and can see if anyone is there.

BRIEF DESCRIPTION OF THE DRAWING

FIG. 3 is a sectional view along lines 3—3 of FIG. 2.

FIG. 4 is a side view of one embodiment of the reflecting mirror used with round stock.

FIG. 5 is a sectional view taken along lines 5—5 of FIG. 2.

DETAILED DESCRIPTION

Figure 1:
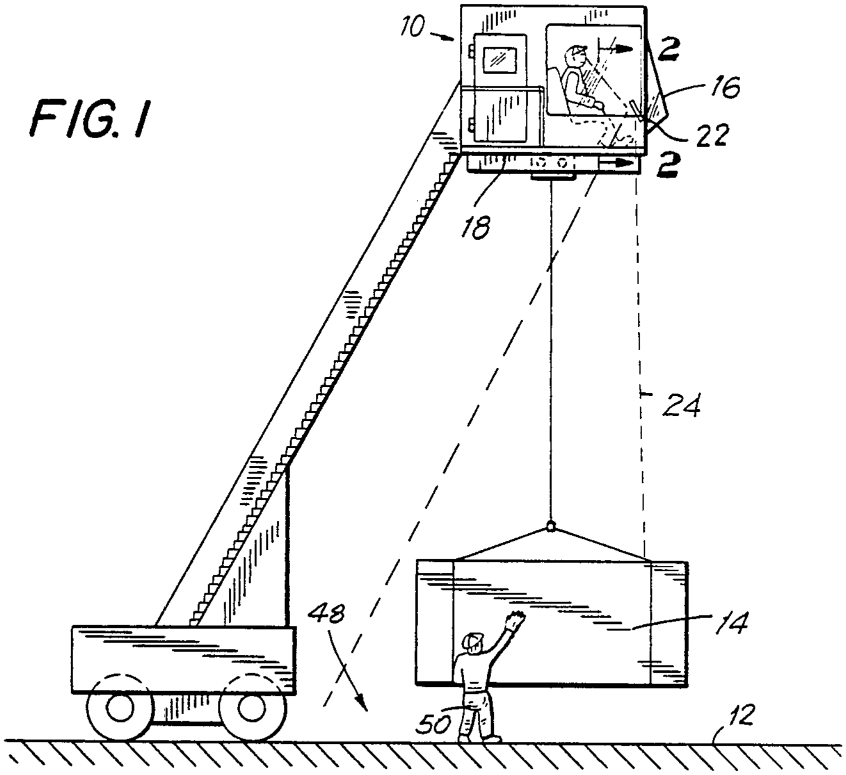
FIG. 1 is an illustrative view of the crane shown above a loading deck with a load thereon and the crane cab of this invention.

A crane cab 10 is located high above the deck 12 of a ship on which there is a load 14. The load 10 is lifted by the crane operator who lifts the load and moves it. The load is carried forward or backward by the crane operator, and when it is to be moved forward, the operator can see out the front window 16. In accordance with the principles of this invention, the floor 18 of the cab has a clear window 20 and a reflecting mirror 22 is provided in front of the operator and a level 22 below the operator. Dotted lines 24 illustrate how the operator can see below and behind him without leaving his seat.

Figure 6:
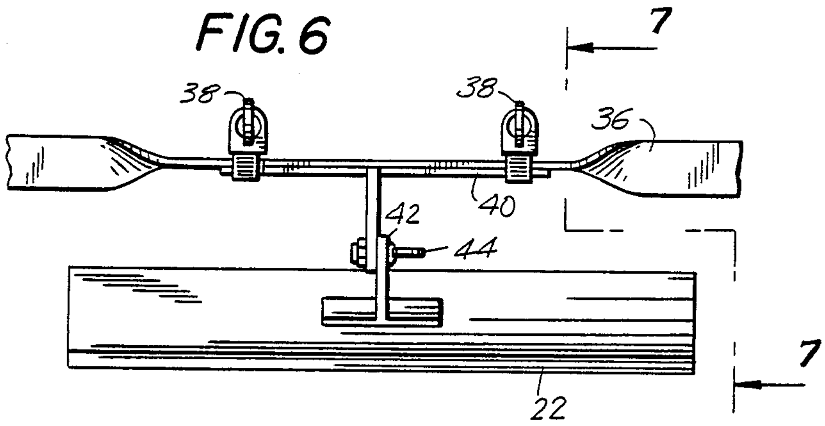
FIG. 6 is a top view of another embodiment of the mirror used with flat stock.
Figure 7:
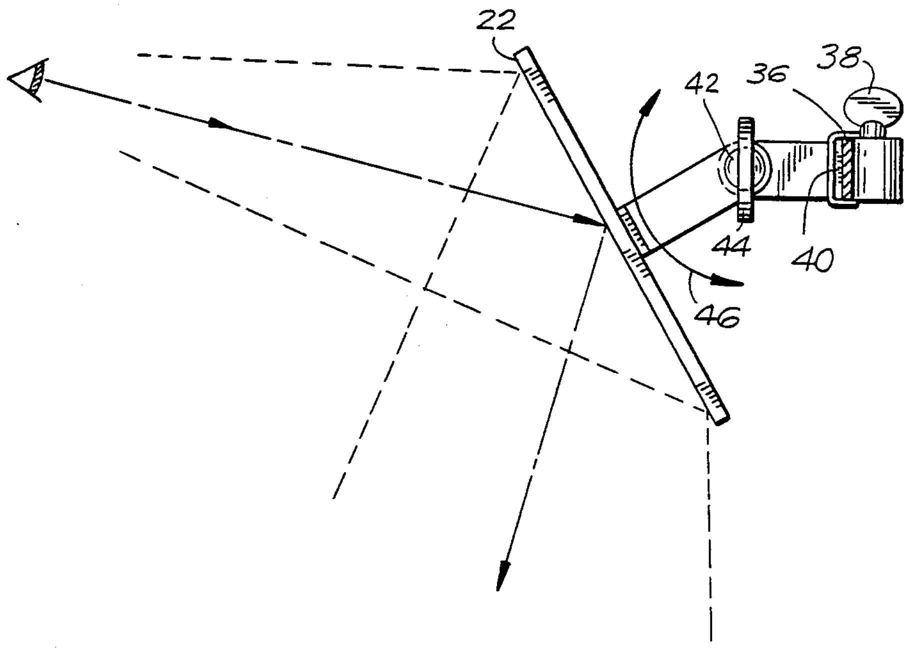
FIG. 7 is a sectional view taken along lines 7—7 of FIG. 6.

The reflecting mirror 20 may be attached to a bracket assembly 26 (FIG. 3), and the bracket assembly is attached to a round pipe 28 and secured thereto with wing nuts 30 which draw a sleeve 32 around the cylindrical pipe 28. In this fashion, the mirror 22 can be moved upwardly or downwardly as shown by arrow 34 to fix the viewing position of the mirror 22. In an alternate embodiment illustrated in FIG. 6, the mirror 22 is attached to flat stock bar 36 by means of wing nuts 38 attached to brackets 40 which themselves are attached to a pivotable mounting 42. The pivotable mounting 42 is controlled by a wing nut 44, which when loosened allows the mirror 22 to be rotated upwardly or downwardly as illustrated by arrow 46 in FIG. 7.

Figure 2:
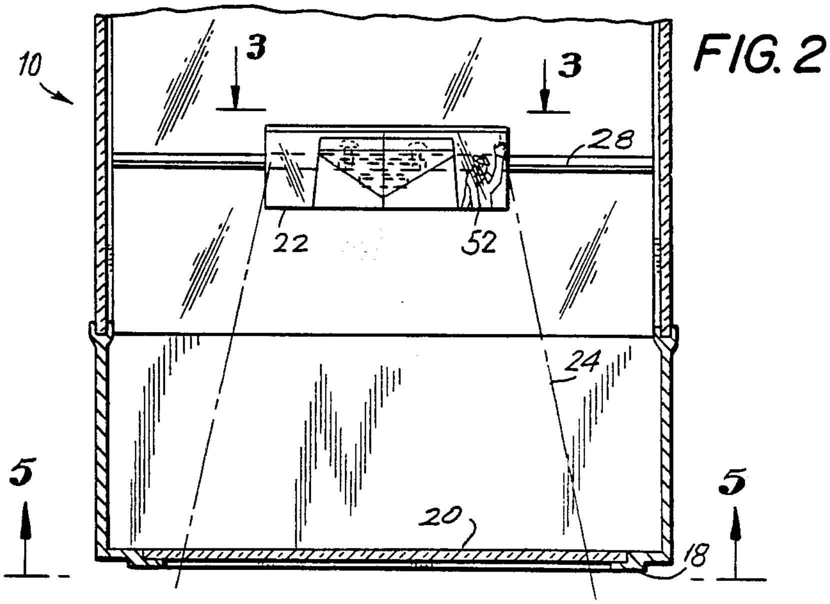
FIG. 2 is a sectional view along lines 2—2 of FIG. 1.

In operation, the operator adjusts mirror 22 so that he can easily view the area 48 below and beneath the crane without leaving his seat. The mirror is easily adjusted either by wing nut 44 or by merely moving mirror 22 as in FIG. 4 to enable the operator to have a clear view of the area he wishes to observe. As can be seen in FIG. 2, a person 50 working on the dock will be seen in the mirror reflection 52 so that the operator will know whether or not people are in the area or whether or not it is advantageous to move the load at that time.

As illustrated, only a portion of the floor has a clear opening, although the entire floor could be made of a rigid plastic material which would support the operator and enable clear vision to be achieved.

The instant invention has been described with several embodiments, but other embodiments may be devised by those skilled in the art which will fall in the scope of protection as set forth in the appended claims.

What is claimed is:

1. Safety apparatus enabling a crane operator in a crane cab to see the area below and behind the crane cab without leaving his seat, said apparatus comprising a window formed in the floor of said crane under the operator's seat, a mirrow located in front of said operator being positioned to permit the operator to view the area below and behind the cab of the crane while the operator is in his seat.

2. A safety apparatus as set forth in claim 1, wherein the mirror is mounted below operator eye level and between operator eye level and the floor of the crane.

3. A safety apparatus as set forth in claim 1, wherein the mirror is positionally rotatable to enable the operator to change the viewable area.

4. A safety apparatus as set forth in claim 2, wherein the mirror is positionally rotatable to enable the operator to change the viewable area.

5. A safety apparatus as set forth in claim 3, wherein the mirror is positioned to permit the operator to change the angle of the mirror without leaving his seat.

6. A safety apparatus as set forth in claim 5, wherein the mirror is directly controlled by the operator.

7. A safety apparatus as set forth in claim 4, wherein the mirror is positioned to permit the operator to change the angle of the mirror without leaving his seat.

8. A safety apparatus as set forth in claim 7, wherein the mirror is directly controlled by the operator.

9. A safety apparatus as set forth in claim 1, wherein the mirror is rotatably mounted on a flat bar, said mirror attached to a rotatable bracket which is attached to said flat bar.

10. A safety apparatus as set forth in claim 2, wherein the mirror is rotatably mounted on a flat bar, said mirror attached to a rotatable bracket which is attached to said flat bar.

11. A safety apparatus as set forth in claim 3, wherein the mirror is rotatably mounted on a flat bar, said mirror attached to a rotatable bracket which is attached to said flat bar.

12. A safety apparatus as set forth in claim 1, comprising clamps to mount the mirror to a round bar, said clamps being attached to the rear of said mirror and being adjustable to permit rotating of said mirror.

13. A safety apparatus as set forth in claim 2, comprising clamps to mount the mirror to a round bar, said clamps being attached to the rear of said mirror and being adjustable to permit rotating of said mirror.

14. A safety apparatus as set forth in claim 3, comprising clamps to mount the mirror to a round bar, said clamps being attached to the rear of said mirror and being adjustable to permit rotating of said mirror.

15. A safety apparatus as set forth in claim 1, wherein the entire floor of said cab comprises a transparent material.

16. A safety apparatus as set forth in claim 2, wherein the entire floor of said cab comprises a transparent material.

17. A safety apparatus as set forth in claim 1, wherein a significant portion of the floor of said cab comprises a transparent material.

18. A safety apparatus as set forth in claim 1, wherein the significant portion of the floor of said cab comprises a transparent material.

* * * * *